H. CARSON.
Cultivator Teeth.
No. 203,417. Patented May 7, 1878.
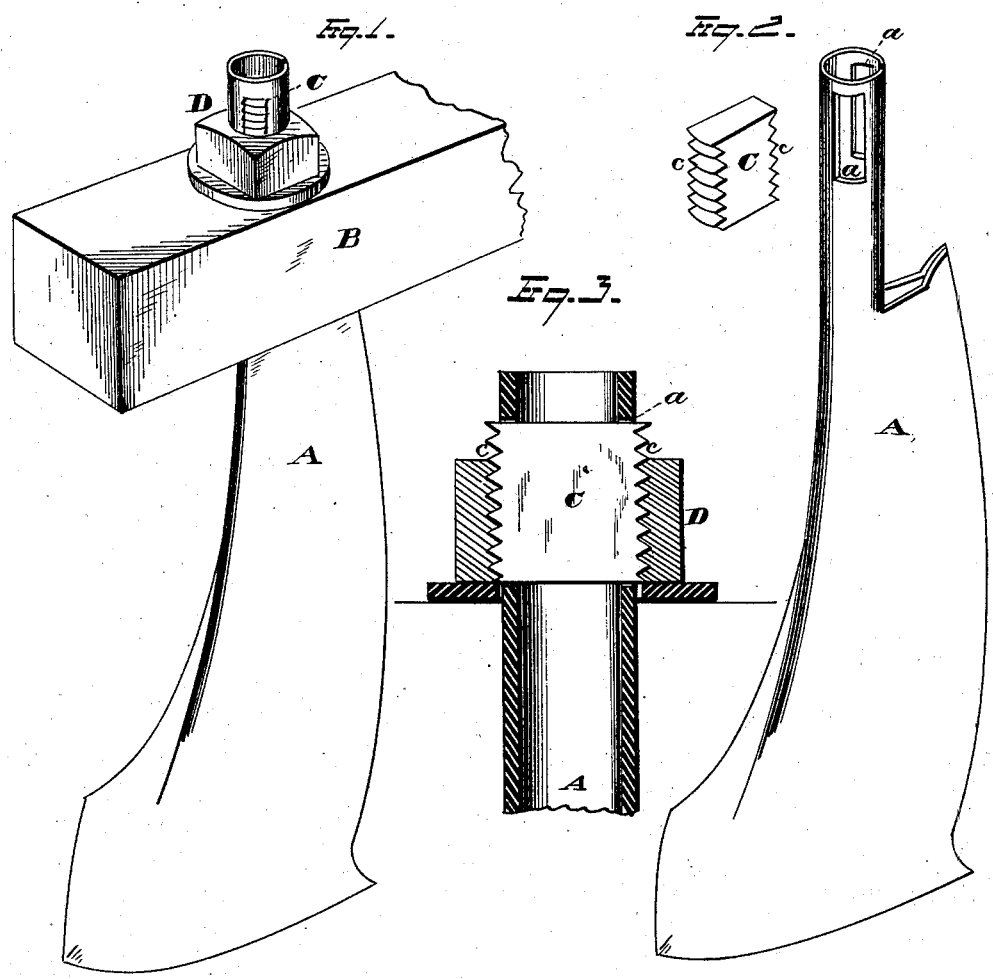
WITNESSES
Ed. J. Nottingham
A. W. Bright
INVENTOR
Hugh Carson,
By Leggett and Leggett,
ATTORNEYS.

UNITED STATES PATENT OFFICE.

HUGH CARSON, OF PITTSBURG, PENNSYLVANIA, ASSIGNOR TO ALEXANDER SPEER & SONS, OF SAME PLACE.

IMPROVEMENT IN CULTIVATOR-TEETH.

Specification forming part of Letters Patent No. 203,417, dated May 7, 1878; application filed April 8, 1878.

*To all whom it may concern:*

Be it known that I, HUGH CARSON, of Pittsburg, in the county of Allegheny and State of Pennsylvania, have invented certain new and useful Improvements in Cultivator-Teeth; and I do hereby declare the following to be a full, clear, and exact description of the invention, such as will enable others skilled in the art to which it pertains to make and use it, reference being had to the accompanying drawings, which form part of this specification.

My invention relates to improvements in cultivator-teeth, and is designed to provide a simple means for securing the same to the cultivator-frame.

It consists in forming the shank of a cultivator-tooth with two slots, respectively on opposite sides thereof, through which the two extremities of a transverse key or cross-bar pass, this key or bar extending across the horizontal diameter of the tooth's shank, and having its transverse ends threaded as they project from the side of the latter, so as to engage with a nut or similar fastening device.

In the drawings, Figure 1 is a view, in perspective, of a cultivator-tooth embodying my invention, and shown attached as in use to the section of a cultivator-frame. Fig. 2 is a view of the tooth free from the frame. Fig. 3 is a detached sectional view of the shank of the tooth.

The tooth A is made with the two slots *a* formed in line with each other, and respectively on opposite sides of its shank, which latter projects suitably above the cultivator-frame B. Through these slots the extremities of a key or cross-bar, C, pass, and project therefrom, so as to engage with the nut or similar fastening device D. These ends are threaded in their sectional or transverse dimensions, as shown at *c*, and thus present screw-threaded engagement with the nut. In this manner the tooth is readily secured to the cultivator-frame in a very simple, economical, and firm lock.

While it is preferable to make the key or cross-bar in horizontal line, so as to be at right angles to the length of the shank of the tooth, yet it is apparent that the same may be in a horizontally-inclined position.

Having fully described my invention, what I claim as new, and desire to secure by Letters Patent, is—

1. A cultivator-tooth whose shank is provided with a key or cross-bar having threaded transverse ends which project through its sides and are adapted to engage with a nut or similar fastening device, substantially as set forth.

2. The combination, with a cultivator-frame, of a cultivator-tooth, the two secured together by the engagement of a nut or similar fastening device with a key or bar, which latter has threaded transverse ends projecting through the sides of the tooth's shank, substantially as set forth.

In testimony that I claim the foregoing I have hereunto set my hand this 3d day of April, 1878.

HUGH CARSON.

Witnesses:
 FRANCIS TORRANCE,
 WILLIAM W. SPEER.